Nov. 10, 1959  F. T. MACHALEK  2,912,621
HEADLIGHT OVERRIDING SYSTEM
Filed April 18, 1957
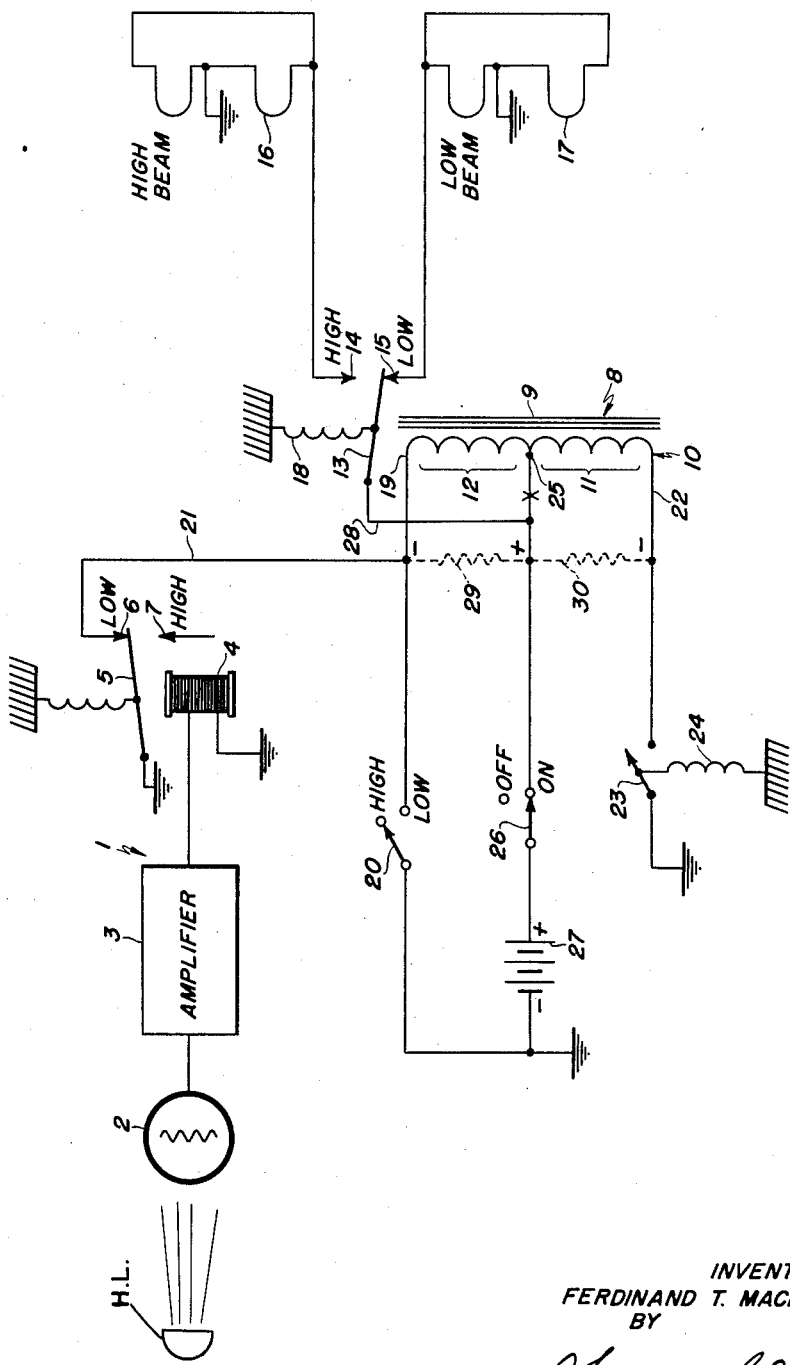
INVENTOR.
FERDINAND T. MACHALEK
BY
George A. Gust
ATTORNEY

United States Patent Office 2,912,621
Patented Nov. 10, 1959

2,912,621

HEADLIGHT OVERRIDING SYSTEM

Ferdinand T. Machalek, Fort Wayne, Ind., assignor to International Telephone and Telegraph Corporation Application April 18, 1957, Serial No. 653,624

9 Claims. (Cl. 315—83)

The present invention relates to an automatic headlight dimmer overriding system and more particularly to a unique magnetic circuit which is both automatically and manually operable, the manual operation dominating the automatic operation.

In operating an automotive vehicle at night, high beam or bright lighting may be needed to illuminate the roadway a substantial distance ahead of the vehicle. When operating with the headlight in high beam condition, it is often necessary to revert to low beam or dim lighting when passing an approaching vehicle or when approaching a vehicle from the rear. For this purpose, there is conventionally provided a foot-operated beam control switch, commonly called a dimmer switch, which in one position energizes the high beam circuit and in the other position the low beam circuit.

Failure to dim the headlights when approaching a vehicle coming from the opposite direction often blinds the driver to such an extent that he is unable to see the road and to properly steer the vehicle. Such blinding conditions have often been the cause of serious accidents, the blinded operator steering out of his lane either into the path of the oncoming vehicle or off the road to the opposite side.

For promoting safer driving, automatic headlight dimming apparatuses must be subject to manual domination whereby the driver may dim or brighten his lights at will. There are some instances in which automatic operation is not desired. For example, when approaching a curve or hill and noticing the approach of another vehicle it may be desirable to dim the headlights prior to meeting the oncoming headlights fully. In this instance, the automatic apparatus will not operate soon enough for safest driving, thus the necessity for the apparatus being subject to manual operation to suitably dim the lights in advance of the automatic operation. There are many other instances in which it is desirable or necessary that the headlights be under manual control.

It is therefore an object of this invention to provide an overriding control system for an automatic headlight dimmer whereby manual operation of the headlights may be effected at will.

It is another object of this invention to provide a headlight overriding system wherein a uniquely arranged magnetic circuit provides selective control of a switch for shifting between bright and dim lights.

In accordance with this invention there is provided a headlight overriding system comprising a magnetic switch having an armature and a differential magnetic force producing device cooperatively associated therewith, said device comprising first and second electromagnetic elements of opposite polarity and unequal magnetic strength with respect to said armature, the relative strength of said electromagnetic elements being such that simultaneous energization thereof causes no movement of the armature, but energization of said first element prior to said second element moves the armature and then releases it sequentially, and energization of the second element prior to the first element moves the armature in one direction only, an automatic photosensitive switch operatively coupled to the first element for energizing the same, and an overriding switch operatively coupled to the second element for energizing the same.

The above-mentioned and other features and objects of this invention and the manner of attaining them will become more apparent and the invention itself will be best understood by reference to the following description of an embodiment of the invention taken in conjunction with the accompanying drawing which is a schematic diagram of one embodiment of this invention.

Referring to the drawing, an automatic photosensitive switch indicated generally by the reference numeral 1 comprises a photocell 2, an amplifier 3 and an electromagnetic relay 4. Headlights from an approaching vehicle falling on photocell 2 produce a signal which is amplified by the amplifier 3 thereby energizing the relay 4. The armature or switch arm 5 of the relay is thereupon shifted from engagement with contact 6 to contact 7, the contact 6 serving to energize the low beam of the headlights when contacted by the armature 5. Amplifier 3 may be of any known type, it being required only to be capable of energizing relay 4 in the absence of excitation of photocell 2 by light rays. However, as will become apparent to the person skilled in the art, any photosensitive switching circuit selectively responsive to the illumination of approaching headlights may be used without departing from the scope of this invention.

A differential magnetic force-producing device or relay as indicated generally by the reference numeral 8 comprises a magnetic core 9 of iron or the like having a coil 10 wound thereon. In one specific embodiment of this invention, the coil 10 is composed of two layers of windings, the first winding being that portion of the coil indicated by the bracket 11 and being closest to core 9, the other winding being that portion indicated by the bracket 12, the portion 12 being wound over the portion 11. Only one size wire is used, and the number of turns in each coil portion 11, 12 may be the same. For one specific size of wire, the resistance of the coil portion 11 is preferably forty (40) ohms while the resistance of the portion 12 is preferably seventy (70) ohms, the reason for this difference being that the diameter of the turns of the portion 12 is larger than that of the portion 11.

An armature or switch arm 13 is pivotally mounted in cooperative relation with the core 9 and is movable between two switch contacts 14 and 15. The contact 14 leads to the high beam filaments 16 of the headlights while the contact 15 leads to the low beam filaments 17. A tension spring 18 connected to the armature 13 yieldably urges the latter into engagement with contact 14.

The upper end 19 of the coil portion 12 is connected to the ground through the usual foot-operated dimmer switch 20. Also, this end 19 is connected to the low beam contact 6 of the automatic switch by means of a line 21.

The opposite end 22 of the coil 10 is connected to ground through a normally open overriding switch 23, a suitable compression spring 24 normally holding this switch open. The coil 10 is tapped at the juncture 25 of the coil portions 11 and 12, and a wire extending therefrom leads to a suitable switch 26 which is connected to the positive terminal of a storage battery 27. The negative terminal of this battery is grounded as shown. Also, connected to the tap 25 is a line 28 leading to the switch arm 13.

In operation, assuming that the switches are in the positions illustrated, and which positions correspond to the detection by photocell 2 of the rays of headlight HL of an approaching vehicle, not otherwise shown, an energizing circuit for the coil portion 12 will be established from the contact 6, through the coil portion 12 to the positive terminal of the battery 27 thereby closing the switch arm 13 against the contact 15 for energizing the low beam filaments 17. If the rays of headlight HL no longer excite photocell 2, relay 4 will re-energize and the arm 5 of switch 1 moves away from the contact 6 and the coil portion 12 will be de-energized thereupon releasing the arm 13 which engages contact 14 under the force of the spring 18. A circuit is thus completed for the energization of the high beam filament 16.

Assuming that the arm 5 of switch 1 engages contact 6 simultaneously with the closure of overriding switch 23, both coil portions 11 and 12 will be energized. By reason of the fact that the magnetic fields of these coils are of opposite polarity, the armature 13 will not be disturbed but will remain in engagement with the contact 14. Opening either of the contacts 5, 6 or overriding switch 23 without opening the other will result in actuation of the armature 13 by reason of the coil portion 11 or 12, as the case may be, remaining energized.

In actual operation, the photocell 2 is mounted at some position on the vehicle which receives illumination from the headlights HL of an approaching vehicle. In the absence of such illumination, the amplifier 3 so operates as to normally energize the relay 4 causing the arm 5 to engage the contact 7. In the presence of illumination, the photocell 2 produces a signal resulting in de-energization of the relay 4 which releases the arm 5 into engagement with contact 6 which condition is represented in the drawing. With the overriding switch 23 open, the coil portion 12 is energized, thereby moving the armature 13 into engagement with contact 15 for energizing the low beam 17.

As the illumination leaves the photocell 2, the relay 4 is energized, thereby breaking the circuit to the coil portion 12 allowing the armature 13 to be retracted into engagement with the contact 14 thereby energizing the high beam 16.

Considering now all of the different possibilities of operation of the system, let it first be assumed that the automatic switch 1 is on "low" position due to the excitation of photocell 2 by rays of headlight HL, and the override switch 23 is "open" as shown; the armature 13 will move to "low" position. When the automatic switch 1 is on "high" position, and the override switch 23 is "open," the armature 13 will be on "high" position.

With the automatic switch 1 in "low" position and the override switch 23 being actuated by the operator to closed position, the armature 13 will return to "high" position the moment switch 23 is closed. The reason for this shift of armature 13 from "low" to "high" positions resides in the fact that the magnetic force of the coil portion 11 is overbalanced against that of coil portion 12 which is opposite in polarity, which results in a reduction of the force exerted on the armature 13 allowing the latter to be released under the force of the spring 18. Of course, it will be necessary to properly relate the force of the spring 18 with the slight differential in force between the two coil portions 11, 12 so that this particular operation will obtain.

Now assuming that the automatic switch 1 is on "high" position and the override switch 23 is closed, the armature 13 will be shifted to "low" position by energization of the coil portion 11.

Assuming that the override switch 23 is open and the armature 13 is on "high" position, closure of override switch 23 results in the shifting of armature 13 to "low" position. Now if automatic switch 1 moves to "low" position, the armature 13 will not be disturbed, because the magnetic force exerted by the coil portion 11 is sufficiently greater than the opposite force of coil portion 12 to hold the armature 13 against the low beam contact 15. If now the override switch 23 is opened, the armature 13 will remain in "low" position by reason of the energization of the coil portion 12 (the automatic switch 1 still being in "low" position). Now, closure of the override switch 23 energizes the coil portion 11, resulting in the release of armature 13 returning it to "high" position, this release resulting from the fact that the magnetic force of the coil portion 11 equalizes or balances out the force of the coil portion 12.

As will now be apparent from the foregoing explanation, the particular sequence of energization of the coil portions 11, 12 will determine whether or not the armature 13 is released or actuated. This particular operation is primarily due to the fact that the magnetic fields of the two coil portions 11 and 12 are unequal and opposite by an amount which will permit the operation just explained.

Instead of using the tap 25 on the coil 10, two resistors 29 and 30 connected in series across the coil 10 may be used, the juncture of these resistors being connected to the switch 26 while the line to the tap 25 is broken at the point marked "X." In order to obtain the aforedescribed selective operation, the two resistors 29 and 30 should be of unequal values, for example, the resistor 30 having approximately twice the resistance of that of the resistor 29.

With the arrangement of the foregoing, the automatic switch 1 will automatically shift the headlights between the high beam and low beam positions upon the approach of an oncoming vehicle. However, if for some reason it is desired to operate the headlight manually, it is only necessary to close the switch 23 which may be mounted on the floorboard to be foot-operated. Regardless of the position of the automatic switch 1, the operator can secure either high beam or low beam operation at will.

While I have described above the principles of my invention in connection with specific apparatus, it is to be clearly understood that this description is made only by way of example and not as a limitation to the scope of my invention.

What is claimed is:

1. An automatic headlight dimmer overriding system comprising a magnetic switch having a member movable between first and second positions, first and second magnetic force-producing means, both magnetic means being positioned to exert a magnetic force which moves said member, both said magnetic means being polarized oppositely and producing unequal magnetic forces with respect to said member, the magnetic force of each means being sufficient to actuate said member in the absence of the other; said magnetic forces further being related such that application of both means simultaneously to said member produces no movement of the latter, application of said first means prior to said second means moves said member from the first to the second position and then releases said member, and application of said second means prior to said first means moves said member from the first to the second position only; automatic switch means operatively coupled to said first means for selectively energizing the latter, and manually operable switch means operatively coupled to said second means for selective energization thereof, whereby operation of said manually operable switch means overrides the operation of said automatic switch means.

2. The system of claim 1 wherein the first and second magnetic force-producing means are electromagnets having energizing coils, the automatic switch means being operatively coupled to the coil of the first magnetic force-producing means and the manually operable switch means being operatively coupled to the coil of the second magnetic force-producing means.

3. The system of claim 1 wherein the first and second magnetic force-producing means are electromagnets having energizing coils, the automatic switch means being operatively coupled to the coil of the first magnetic force-producing means and the manually operable switch means being operatively coupled to the coil of the second magnetic force-producing means, the coil of said first means having a resistance greater than that of the coil of said second means.

4. An automatic headlight dimmer overriding system comprising a magnetic switch having an armature and a differential magnetic force-producing device cooperatively associated therewith, said device comprising first and second electromagnetic elements of opposite polarity and unequal magnetic strength with respect to said armature, the relative strengths of said electromagnetic elements being such that simultaneous energization thereof causes no movement of said armature, energization of said first element prior to said second element moves said armature and then releases it, and energization of said second element prior to said first element moves said armature in one direction only, an automatic photosensitive switch operatively coupled to said first element for energizing the same, and an override switch operatively coupled to said second element for energizing the same.

5. An automatic headlight dimmer overriding system comprising a magnetic switch having an armature and a differential magnetic force-producing device cooperatively associated therewith, said armature being yieldably urged in one direction and movable in the opposite direction under the force of said device, said device comprising first and second electromagnetic elements of opposite polarity and unequal magnetic strength with respect to said armature, the relative strengths of said electromagnetic elements being such that simultaneous energization thereof causes no movement of said armature, energization of said first element prior to said second element moves said armature and then releases it, and energization of said second element prior to said first element moves said armature in said opposite direction only, an automatic photosensitive switch operatively coupled to said first element for energizing the same, and an override switch operatively coupled to said second element for energizing the same.

6. An automatic headlight dimmer overriding system comprising a magnetic switch having an armature and a differential magnetic force-producing device cooperatively associated therewith, said armature being yieldably urged in one direction and movable in the opposite direction under the force of said device, said device comprising a common core, first and second coil portions wound about said core adapted to be oppositely polarized and of unequal magnetic strength, the relative strengths of said coil portions being such that simultaneous energization thereof causes no movement of said armature, energization of said first coil portion prior to said second coil portion moves said armature and then releases it and energization of said second coil portion prior to said first coil moves said armature in said opposite direction only, an automatic photosensitive switch operatively coupled to said first coil portion for selectively energizing the same, and an override switch operatively coupled to said second coil portion for selectively energizing the same.

7. An automatic headlight dimmer overriding system comprising a magnetic switch having an armature and a differential magnetic force-producing device cooperatively associated therewith, said armature being yieldably urged in one direction and movable in the opposite direction under the force of said device, said device comprising an iron core having first and second coil portions thereon which are oppositely polarized and of unequal magnetic strength, the relative strengths of said coil portions being such that simultaneous energization thereof causes no movement of said armature, energization of said first coil portion prior to said second coil moves said armature and then releases it and energization of said second coil portion prior to said first coil moves said armature in said opposite direction only, an automatic photosensitive switch operatively coupled to said first coil portion for selectively energizing the same, and an override switch operatively coupled to said second coil portion for selectively energizing the same.

8. An automatic headlight dimmer overriding system comprising a magnetic switch having an armature and a differential magnetic force-producing device cooperatively associated therewith, said armature being yieldably urged in one direction and movable in the opposite direction under the force of said device, said device comprising an iron core having first and second coil portions thereon which are oppositely polarized, said coil portions having different resistances for producing unequal magnetic strengths, the relative strengths of said coil portions being such that simultaneous energization thereof causes no movement of said armature, energization of said first coil portion prior to said second coil portion moves said armature and then releases it and energization of said second coil portion prior to said first coil portion moves said armature in said opposite direction only, an automatic photosensitive switch operatively coupled to said first coil portion for selectively energizing the same, and an override switch operatively coupled to said second coil portion for selectively energizing the same.

9. The system of claim 8, said magnetic switch having two separated contacts alternatively engageable by said armature, headlights having bright and dim filaments, the bright filament being connected to one contact and the dim filament being connected to the other contact, whereby movement of said armature between said contacts energizes said filaments alternatively.

References Cited in the file of this patent

UNITED STATES PATENTS

| | | |
|---|---|---|
| 2,451,543 | Edell | Oct. 19, 1948 |
| 2,749,478 | Gandelot | June 5, 1956 |
| 2,786,963 | Vogt | Mar. 26, 1957 |